No. 880,605. PATENTED MAR. 3, 1908.
D. L. TSCHANTZ.
VEHICLE HUB.
APPLICATION FILED SEPT. 24, 1907.
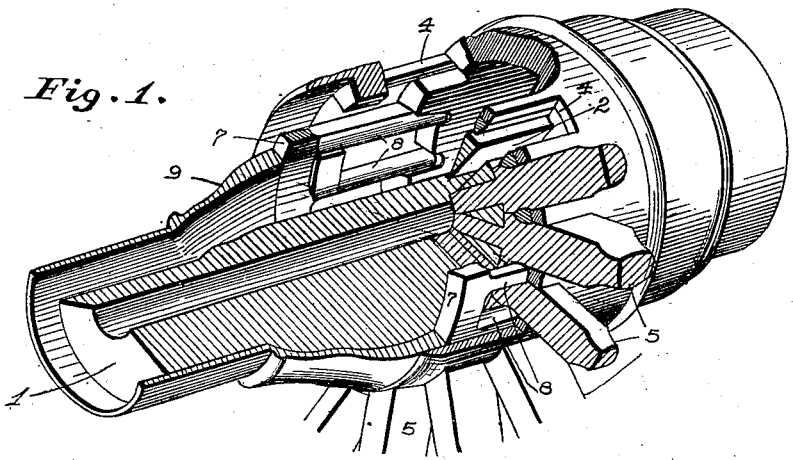
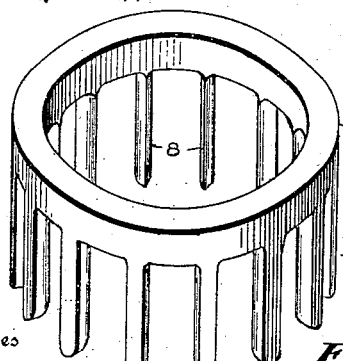
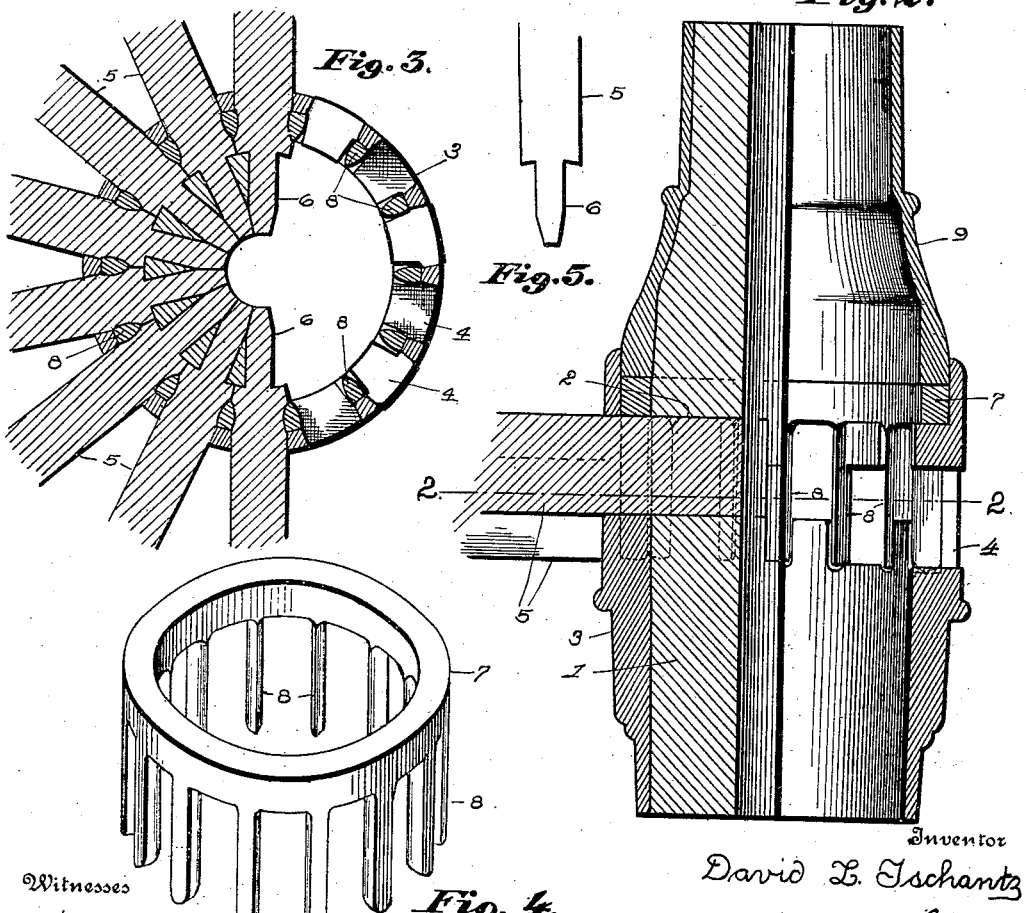
Witnesses
Harry O. Rostetter
Sylvia Boron
Inventor
David L. Tschantz
F. W. Bond
Attorney

UNITED STATES PATENT OFFICE.

DAVID L. TSCHANTZ, OF CANTON, OHIO.

VEHICLE-HUB.

No. 880,605.     Specification of Letters Patent.     Patented March 3, 1908.

Application filed September 24, 1907. Serial No. 394,320.

*To all whom it may concern:*

Be it known that I, DAVID L. TSCHANTZ, a citizen of the United States, residing at Canton, in the county of Stark and State of Ohio, have invented certain new and useful Improvements in Vehicle-Hubs; and I do hereby declare that the following is a full, clear, and exact description of the same.

The object of the present invention is to provide means whereby the spokes of a vehicle wheel are bound or locked in the hub proper, the binding or locking device being in addition to the usual mortise into which the tenons or inner ends of the spokes are inserted. This object is carried out as hereinafter described and illustrated in the drawings, making a part of the specification and the numerals and figures of reference marked thereon, in which—

Figure 1 is a view of the hub showing parts broken away. Fig. 2 is a longitudinal section showing parts of the hub proper and some of the spokes removed. Fig. 3 is a transverse section on line 2—2 Fig. 2. Fig. 4 is a detached perspective view of the spoke retaining band and its tangs. Fig. 5 is a detached view of a portion of one of the spokes.

Similar numerals of reference indicate corresponding parts in all the figures of the drawing.

In the accompanying drawing, 1 represents the hub body, which is of the usual construction and is provided with the mortises 2; but the hub body within itself forms no particular part of the present invention, except that a hub body must necessarily be employed to construct a hub in which my improvement is embodied. The metal band 3 is formed of a length equal to or somewhat greater than one-half of the hub body 1, which band is provided with the spoke mortises or openings 4.

In assembling the parts just above described, the hub body 1 is placed in the metal band 3 as best illustrated in Fig. 2 and the parts so positioned with reference to each other that the mortises 2 and 4 will register. After the metal band and the hub body 1 have been placed in proper relative position, the spokes 5 are placed in proper position or in other words the tenons 6 are forced into the mortises 2 and 4 as best illustrated in Fig. 3. After all of the spokes have been properly connected the ring 7 with the integral spoke retaining tangs 8 is forced into the metal band 3, the tangs 8 coming directly under the band 3 as best illustrated in Fig. 3, said tangs being located beyond the tenons 6 or in other words between the bodies of the spokes 5 and near their inner ends. The tangs 8 are formed substantially V-shaped and are so formed for the purpose of causing the side face of the tangs to abut against the side face of the spokes.

For the purpose of causing the tangs 8 to properly bind and lock the spokes, said tangs are spaced from each other a distance somewhat less than the width of the spokes. It will be understood that by forming the spokes of greater width or of greater thickness than the distance between the faces of two adjacent tangs said tangs will be embedded or sunk into the adjacent or contact portions of the spokes as illustrated in Fig. 3. In order to provide for the proper entering of the tangs 8 between the various spokes 5 the ends of said tangs are rounded or tapered so that in the entering of the tangs between the spokes, said tangs are wedged in between the spokes. The ring 7 together with its integral tangs 8 is placed in position by pressure, which may be of any kind, but must be of sufficient force to embed the tangs 8 into the spokes.

It will be understood that after the ring 7 and the tangs 8 have been properly connected all of the spokes will be securely held in the hub body and metallic ring 3 regardless of any shrinking or looseness of the spokes as between the mortises 2 and 4 and the tenon 6, but notwithstanding the fact that the tangs 8 clamp and lock the spokes, the spokes should be fitted to the hub proper with the usual care and accuracy. It is well understood that the tenons of vehicle wheels are liable to become loose in their mortises by reason of the shrinking and swelling of the wood and by a continuous jarring from use, but with my improved device the jarring and the strain is partially removed from the tenons so that should the tenons become loosened in their mortises the spokes will be firmly held in the hub proper.

It will be understood that the metal band 9 should be placed over the hub body 1 as illustrated in Figs. 1 and 2 and properly connected to the metal band 3 in the usual manner. After the metal bands 3 and 9 have been properly connected together there can be no displacement of the ring 7 and its integral tangs 8, owing to the fact that the metal band 9 is seated upon the end of the ring 7.

Having fully described my invention what I claim as new and desire to secure by Letters Patent, is—

1. In a vehicle hub, the combination of a hub body, metal bands located upon the hub body and connected together, one of said bands and the hub body provided with mortises, spokes connected to the body and one of the bands, a ring provided with integral tangs and the tangs embedded in the bodies of the spokes and located against the inner periphery of the band provided with the spoke-mortises, substantially as and for the purpose specified.

2. In a vehicle hub, the combination of a hub body, bands located upon the hub body, spokes connected to one of the bands and hub body, a ring provided with spaced tangs, and one of the bands seated upon the ring and the tangs, located against the spokes concentrically beyond the hub body, substantially as and for the purpose specified.

3. In a vehicle hub, the combination of a hub body, bands located upon the hub body, spokes connected to one of the bands and hub body, a ring provided with spaced tangs, and one of the bands seated upon the rings and the tangs located against the spokes concentrically beyond the hub body, and the tangs seated in the spoke bodies, substantially as and for the purpose specified.

4. In a vehicle hub the combination of a hub body, bands located upon the hub body and connected together, spokes connected to one of the bands and hub body, spaced tangs pointed at their spaced ends, said tangs located around the hub body and between the bodies of the spokes and said tangs abutting against the inner periphery of the band provided with the spoke mortises, substantially as and for the purpose specified.

5. In a vehicle hub, the combination of a hub body, bands connected together and located upon the hub body, a ring provided with tangs, spokes connected to one of the bands and to the hub body and the tangs located concentrically with one of the rings and between the spokes, said tangs embedded in the body of the spokes, substantially as and for the purpose specified.

6. In a vehicle hub provided with spoke mortises, metal bands connected to said hub body, and one of the bands provided with spoke mortises adapted to register with the mortises in the hub body, tenons located in the mortises, a ring provided with tangs spaced from each other a distance less than the thickness of the spoke bodies, and said tangs embedded in the spoke bodies beyond the tenons of said spokes, substantially as and for the purpose specified.

7. In a vehicle hub provided with spoke mortises, metal bands connected to said hub body, and one of the bands provided with spoke mortises adapted to register with the mortises in the hub body, tenons located in the mortises, a ring provided with tangs spaced from each other a distance less than the thickness of the spoke bodies, and said tangs embedded in the spoke bodies beyond the tenons of said spokes, the ends of the tangs being tapered, substantially as and for the purpose set forth.

In testimony that I claim the above, I have hereunto subscribed my name in the presence of two witnesses.

DAVID L. TSCHANTZ.

Witnesses:
   J. A. JEFFERS,
   F. W. BOND.